Dec. 26, 1961     D. T. GEISER     3,014,977
TERMINAL ADAPTERS
Filed Jan. 27, 1958

INVENTOR
DAVID T. GEISER
BY Connolly and Hutz
HIS ATTORNEYS

United States Patent Office 3,014,977
Patented Dec. 26, 1961

3,014,977
TERMINAL ADAPTERS
David T. Geiser, North Adams, Mass., assignor to Sprague Electric Company, North Adams, Mass., a corporation of Massachusetts
Filed Jan. 27, 1958, Ser. No. 711,439
1 Claim. (Cl. 174—52)

This invention relates to the connection to a capacitor terminal and more particularly to an adapter arrangement providing for more than two leads attached to a terminal.

Electrical circuit devices are provided with terminals to which leads are attached for the purpose of electrical connection. One such device is a transmitting capacitor designed to work under high potential voltage in the order of 1000 volts. The leads attached to such a capacitor are generally screw threaded onto a threaded terminal end or are held on the threaded terminal end by nuts which are screw threaded onto a terminal end. The disconnection of a capacitor thus attached involves an awkward even sometimes difficult operation of turning the nut on the threaded terminal. This had to be managed in order to release the lead and permit its removal from the terminal end. Aside from the time consumed in such an operation, the positioning of a capacitor in an assembly might well make such an operation undesirable.

It is an object of this invention to provide an attachment of a lead to a capacitor terminal by easily disconnectable means.

It is another object of this invention to provide an arrangement adapted to a threaded capacitor terminal which will permit an easily removable connection of a lead to a threaded terminal and provide additional lead connections to the same threaded terminal.

It is still another object of this invention to provide a lead end and a terminal adapter which cooperate and at the same time are attachable to a threaded terminal to provide a snap connection between said threaded terminal and the lead and also provide means for permitting the attachment of other leads to the terminal.

Figure 1:
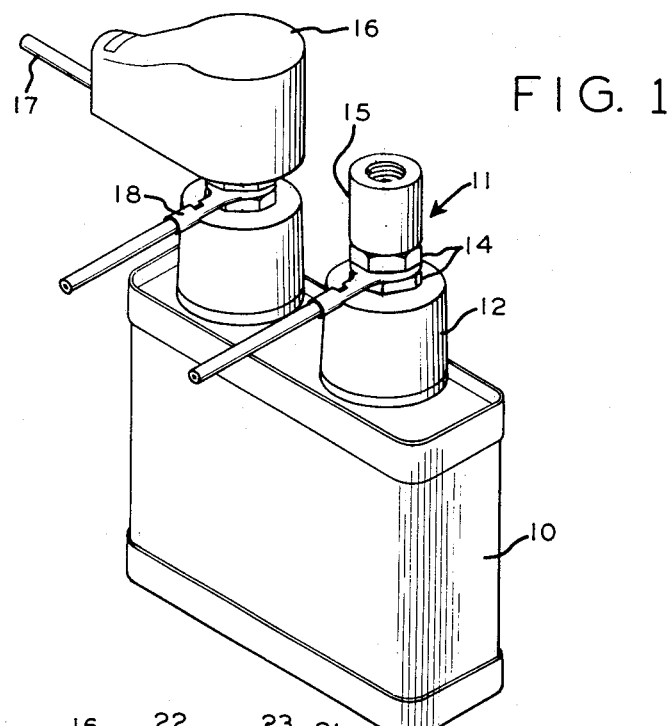
Figure 2:
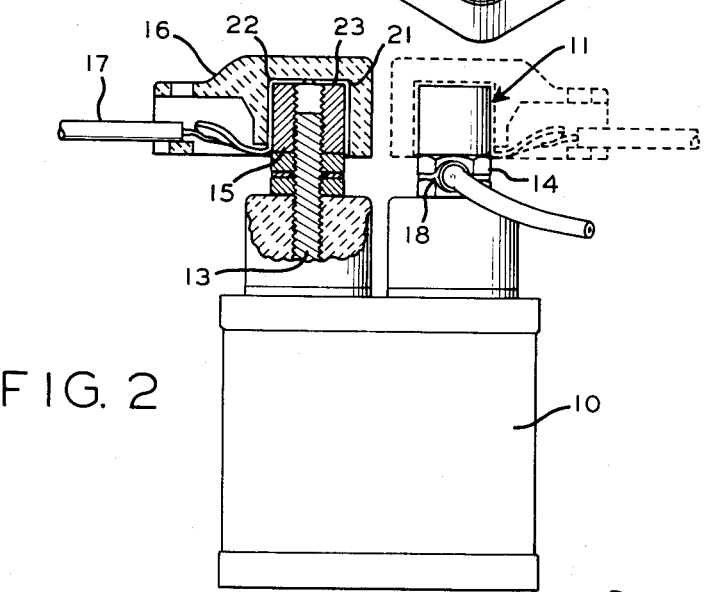

These and other objects will become more apparent upon consideration of the following descriptions taken together with the accompanying drawings in which:

FIG. 1 is a perspective view of a transmitting capacitor for threaded terminals with the terminal adapter and lead attached according to this invention; and FIG. 2 is a side elevation of the capacitor of FIG. 1 partially in section showing the cooperation of parts according to this invention.

In general this invention involves the attachment of leads to a terminal of a high voltage electrical device such as a transmitting capacitor. More than one lead may be attached to the terminal. A threaded capacitor terminal receives an adapter that threads onto the terminal and provides a binding post onto which a snap cap can be attached. The same terminal is provided with other means for being attached to another lead. The snap cap in turn is attached to a lead which is accordingly electrically connected to the capacitor terminal through the snap cap and the terminal adapter.

Referring to the figures, FIG. 1 shows a capacitor 10 having a pair of terminals 11. The terminals 11 have a porcelain insulator 12 from which threaded posts 13 protrude to receive nuts 14. As shown in the right hand terminals 11, a terminal adapter 15 is mounted on the posts 13 above the respective nuts 14. As seen in connection with the left hand terminals 11, a snap cap 16 is attached to the terminals 11 and is mounted in turn on the end of a lead 17. A connector 18 is attached to each of the terminals 11 and held on the respective threaded posts 13 beneath the respective nuts 14. The connector 18 is adapted to receive a wire lead end by the terminal arrangement of this invention to attach it in the circuit in a desired fashion. This connector is shown mounted between two nuts 14.

Referring to FIG. 2, the section through the left hand terminals 11 shows the interrelationship of snap cap 16 on the terminal adapter 15 which in turn is threaded on the posts 13. The snap cap 16 contains means for connection to the connector posts 13. The snap cap 16 is provided with a post gripping member. In the embodiment shown this is the form of a U-shaped spring 22 which is contained within a chamber 21 in the snap cap 16. A spring contact 23 on the U-shaped spring 22 in the snap cap 16 contacts the adapter 15 and the lead 17 contacts the spring 22.

In the operation of the device of this invention the standard capacitor is attached to the invention by the mounting of an adapter 15 on each of the threaded posts 13. The connector strip 18 attached between two nuts 14 connects with a lead to the same terminal as the snap cap. The lead 17 is attached to the terminal by the snap cap 16 cooperating with the adapter 15. Each of the adapters 15 on the respective posts 13 may receive a lead 17 attached by means of a snap cap 16.

Among other advantages this invention adapts a standard cap to a snap means for attachment in a circuit. It also provides for a multiple connection to a threaded terminal in which one of the connections does not require screwing on a lead for attachment to the terminal. This adaptation is achieved in a most economical manner and with a minimum of effort.

It will be readily apparent that the above embodiment may be modified without departure from the spirit of this invention and the embodiment is set forth herein merely for the purpose of illustration. It is intended that the invention be limited only by the scope of the appended claim.

What is claimed is:

In an electrical capacitor and connections thereto, the combination of a housed capacitor having a voltage rating of the order of 1000 volts, a pair of threaded capacitor terminals attached to said housed capacitor, a separate porcelain insulator on each of said terminals, a threaded portion of each of said terminals protruding from the said porcelain insulator thereon, an internally threaded terminal adapter threadably engaged on the upper end of each of said threaded portions, a snap cap attached to at least one of said terminal adapters, a gripping member in the snap cap for gripping the terminal adapter consisting of a U-shaped spring, a chamber within the snap cap extending radially of said threaded portion, a lead in said chamber attached to said U-shaped spring, at least one lock nut threadedly engaged on each of said threaded portions beneath the respective terminal adapter, a connector engaged on the threaded portion of one of said threaded capacitor terminals having a snap cap attached to the respective terminal adapter, said connector being engaged on said threaded portion by the respective lock nut thereon, whereby said connector and said lead are connected to said housed capacitor.

References Cited in the file of this patent

UNITED STATES PATENTS

| | | |
|---|---|---|
| Re. 11,398 | Sanche | June 24, 1890 |
| 446,871 | Lieb | Feb. 24, 1891 |
| 476,080 | Sanche | May 31, 1892 |
| 2,012,481 | Robinson | Aug. 27, 1935 |
| 2,038,656 | Henrikson | Apr. 28, 1936 |
| 2,228,138 | Larkin | Jan. 7, 1941 |